(12) United States Patent
Cha et al.

(10) Patent No.: US 11,634,052 B2
(45) Date of Patent: Apr. 25, 2023

(54) VEHICLE SEAT BACK AND METHOD OF MANUFACTURING THE SAME

(71) Applicants: Hyundai Motor Company, Seoul (KR); Kia Corporation, Seoul (KR); Hyundai Transys Inc., Seosan-si (KR)

(72) Inventors: Ju Hyun Cha, Seoul (KR); Gil Ju Kim, Seoul (KR); Seon Chae Na, Yongin-si (KR); Chan Ho Jung, Gunpo-si (KR); Teh Chiang Wang, Hwaseong-si (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 0 days.

(21) Appl. No.: 17/464,269

(22) Filed: Sep. 1, 2021

(65) Prior Publication Data

US 2021/0394656 A1 Dec. 23, 2021

Related U.S. Application Data

(62) Division of application No. 16/526,022, filed on Jul. 30, 2019, now Pat. No. 11,130,430.

(30) Foreign Application Priority Data

Nov. 9, 2018 (KR) ........................ 10-2018-0137383

(51) Int. Cl.
| | |
|---|---|
| *B60N 2/70* | (2006.01) |
| *B60N 2/50* | (2006.01) |
| *B60N 2/54* | (2006.01) |
| *B60N 2/64* | (2006.01) |

(52) U.S. Cl.
CPC ........... *B60N 2/7017* (2013.01); *B60N 2/503* (2013.01); *B60N 2/546* (2013.01); *B60N 2/64* (2013.01)

(58) Field of Classification Search
None
See application file for complete search history.

(56) References Cited

U.S. PATENT DOCUMENTS

| | | | |
|---|---|---|---|
| 3,961,823 A | 6/1976 | Caudill, Jr. et al. | |
| 4,115,170 A | 9/1978 | Sanson | |
| 4,268,557 A | 5/1981 | Bracesco | |
| 4,973,235 A | 11/1990 | Shoji | |
| 5,011,394 A | 4/1991 | Katagiri | |
| 10,773,619 B1 | 9/2020 | Hamlin | |
| 11,273,743 B1 * | 3/2022 | Wilkinson | ................ F16B 9/02 |
| 2002/0022423 A1 | 2/2002 | Kroening | |

(Continued)

FOREIGN PATENT DOCUMENTS

| | | |
|---|---|---|
| CN | 203864504 | 10/2014 |
| CN | 204383255 | 6/2015 |

(Continued)

*Primary Examiner* — David E Allred
(74) *Attorney, Agent, or Firm* — Morgan, Lewis & Bockius LLP

(57) ABSTRACT

A vehicle seat back may include an integrated suspension structure including a suspension wire and suspension mounting guides coupled to both sides of the suspension wire; and a seat back pad foamed for integrating with the integrated suspension structure in a state in which the integrated suspension structure is inserted into a mold for seat back pad formation.

4 Claims, 6 Drawing Sheets

(56) References Cited

U.S. PATENT DOCUMENTS

| | | |
|---|---|---|
| 2008/0143157 A1 | 6/2008 | Burch |
| 2011/0221254 A1 | 9/2011 | Lindsay |
| 2012/0032486 A1 | 2/2012 | Baker |
| 2017/0101072 A1 | 4/2017 | Shiga |
| 2017/0232877 A1 | 8/2017 | De Nichilo |
| 2017/0274805 A1 | 9/2017 | Edwards |
| 2017/0349066 A1 | 12/2017 | Fujiwara |
| 2017/0368973 A1 | 12/2017 | Seo |
| 2018/0134189 A1 | 5/2018 | Iwasaki |
| 2019/0337432 A1* | 11/2019 | Smith ................ B60N 2/70 |
| 2020/0391636 A1 | 2/2020 | Coene |
| 2020/0307430 A1* | 10/2020 | Watanabe ............ B60N 2/686 |
| 2021/0330264 A1* | 10/2021 | Sugiyama ............ A47C 7/748 |

FOREIGN PATENT DOCUMENTS

| | | |
|---|---|---|
| CN | 205311410 | 6/2016 |
| CN | 206704027 | 12/2017 |
| CN | 206841235 | 1/2018 |
| JP | H0866270 | 3/1996 |
| JP | 2000245564 | 9/2000 |
| JP | 2001346652 | 12/2001 |
| JP | 2009072916 | 4/2009 |
| JP | 2011115495 | 6/2011 |

* cited by examiner

[ SECTION A-A ]

VEHICLE SEAT BACK AND METHOD OF MANUFACTURING THE SAME

CROSS-REFERENCE TO RELATED APPLICATION

The present application claims priority to Korean Patent Application No. 10-2018-0137383 filed on Nov. 9, 2018, the entire contents of which is incorporated herein for all purposes by this reference.

BACKGROUND OF THE INVENTION

Field of the Invention

The present invention relates to a vehicle seat back and a method of manufacturing the same. More particularly, it relates to a vehicle front seat back and a method of manufacturing the same, in which a suspension structure of a seat back frame can be integrally formed with a seat back pad to reduce the number of parts and an assembly man-hour.

Description of Related Art

As is well known, a vehicle seat may include a seat cushion on which an occupant is accommodated, a seat back for supporting an occupant's back, a headrest for supporting an occupant's head and neck, and the like.

Furthermore, the seat back and the seat cushion include a seat back frame and a seat cushion frame provided as frames, respectively, therein. Especially, various parts including a suspension are assembled in the seat back to withstand a load applied by an occupant's back while providing a predetermined level of elastic force.

FIG. 1 and FIG. 2 illustrate a conventional assembly structure between a seat back frame and a suspension. FIG. 3 illustrates a state in which a seat back pad is covered after the suspension is assembled to the seat back frame.

As illustrated in FIG. 1 and FIG. 2, the seat back frame, which is designated by reference numeral 10, is provided in a form of a vertically elongated rectangular frame when viewed from the front, and the suspension assembled to the seat back frame 10 may include a suspension wire 20, back frame connection bushings 21, suspension springs 22, a side airbag guide 23, and the like.

The seat back frame 10 has a plurality of fastening holes 12 formed in the side and lower plates thereof for assembling with the components of the suspension.

The suspension wire 20 may include a pair of vertical wires 20-1, a plurality of horizontal wires 20-2 connected between the vertical wires 20-1, and a plurality of connection wires 20-3 extending outwardly from the vertical wires 20-1.

The suspension wire 20 is fixedly assembled to the seat back frame 10 through the back frame connection bushings 21, the suspension springs 22, and the like.

In more detail, the suspension wire 20 is assembled to the seat back frame 10 by fitting the external end portions of the connection wires 20-3 into the back frame connection bushings 21 in the state in which the back frame connection bushings 21 are press-fitted into the fastening holes 12 of the seat back frame 10 and the suspension wire 20 is placed in the central empty space of the seat back frame 10.

To impart a predetermined level of elastic force to the suspension wire 20, the suspension springs 22 are connected between the upper end portions of the vertical wires 20-1 and the associated back frame connection bushings 21.

Furthermore, a side airbag is disposed in the seat back, and the side airbag guide 23 is mounted on the external surface of the side plate of the seat back frame 10 by bolts to guide the deployment direction of the side airbag.

As illustrated in FIG. 3, the seat back frame 10, the suspension wire 20, the side airbag guide 23, and the like, which are assembled as described above, are covered with a separate seat back pad 30 provided as a foam pad of the seat back.

However, for assembly of the suspension wire 20 to the seat back frame 10, too many processes are required such as a process of forming the fastening holes 12 in the seat back frame 10, a process of press-fitting the back frame connection bushings 21 into the fastening holes 12, a process of placing the suspension wire 20 in the central empty space of the seat back frame 10, a process of fitting the external end portions of the connection wires 20-3 into the back frame connection bushings 22, a process of connecting the suspension springs 22 between the vertical wires 20-1 and the back frame connection bushings 21, and a process of bolting the side airbag guide 23 to the external surface of the side plate of the seat back frame 10. Hence, there is a problem in that operator's assembly workability is greatly deteriorated.

Moreover, since a large number of parts such as back frame connection bushings 21, suspension springs 22, and mounting bolts are required to assemble the suspension wire 20 to the seat back frame 10, a significant increase in cost may be caused due to the excessive number of parts.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle seat back and a method of manufacturing the same, in which an integrated suspension structure made by assembling a suspension wire and a side airbag guide to each other is disposed in a mold for formation of a seat back pad, and then foamed together with a seat back pad so that the integrated suspension structure is integrated with the seat back pad, allowing for a reduction in the number of processes for assembly of the seat back, a reduction in the number of parts, and cost reduction.

In an exemplary embodiment of the present invention, there is provided a vehicle seat back that may include an integrated suspension structure including a suspension wire and suspension mounting guides coupled to both sides of the suspension wire, and a seat back pad foamed for integrating with the integrated suspension structure in a state in which the integrated suspension structure is inserted into a mold for seat back pad formation.

The suspension wire may include a plurality of horizontal wires and vertical wires connected to the plurality of horizontal wires, and a plurality of hook wires extending obliquely forward from distal end portions of the horizontal wires.

Each of the suspension mounting guides may have a support groove formed in the back thereof for insertion of a seat back frame, and hook fastening holes formed in the front thereof for insertion of hook wires of the suspension wire.

The integrated suspension structure may be embedded in the seat back pad during foaming of the seat back pad, and support grooves formed in the backs of the suspension mounting guides may be exposed to the outside.

A side airbag guide may be formed integrally outwardly from the front of at least one of the suspension mounting guides.

Front end portions of a side plate of a seat back frame may be inserted into the support grooves of the suspension mounting guides.

In another exemplary embodiment of the present invention, there is provided a method of manufacturing a vehicle seat back, which may include providing an integrated suspension structure including a suspension wire and suspension mounting guides coupled to both sides thereof, and foaming a seat back pad after the integrated suspension structure is inserted into a mold for seat back pad foaming such that the integrated suspension structure is integrated with the seat back pad.

The foaming a seat back pad may include providing a mold for seat back pad foaming, inserting the integrated suspension structure into a cavity defined in a lower mold of the mold, placing a middle mold for securing a back profile of the seat back pad on the integrated suspension structure, and injecting a seat back pad foam material into the mold to foam the seat back pad after clamping an upper mold to the lower mold.

In the providing an integrated suspension structure, the suspension wire may include a plurality of horizontal wires and vertical wires connected to the plurality of horizontal wires, and a plurality of hook wires extending obliquely forward from distal end portions of the horizontal wires.

In the providing an integrated suspension structure, each of the suspension mounting guides may have a support groove formed in the back thereof for insertion of a seat back frame, and hook fastening holes formed in the front thereof for insertion of hook wires of the suspension wire, and a side airbag guide may be formed integrally outwardly from the front of at least one of the suspension mounting guides.

The integrated suspension structure may be embedded in the seat back pad after the foaming of the seat back pad, and support grooves formed in the backs of the suspension mounting guides may be exposed to the outside.

The method may further include inserting a side plate of a seat back frame into the support grooves of the suspension mounting guides after the foaming of the seat back pad.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
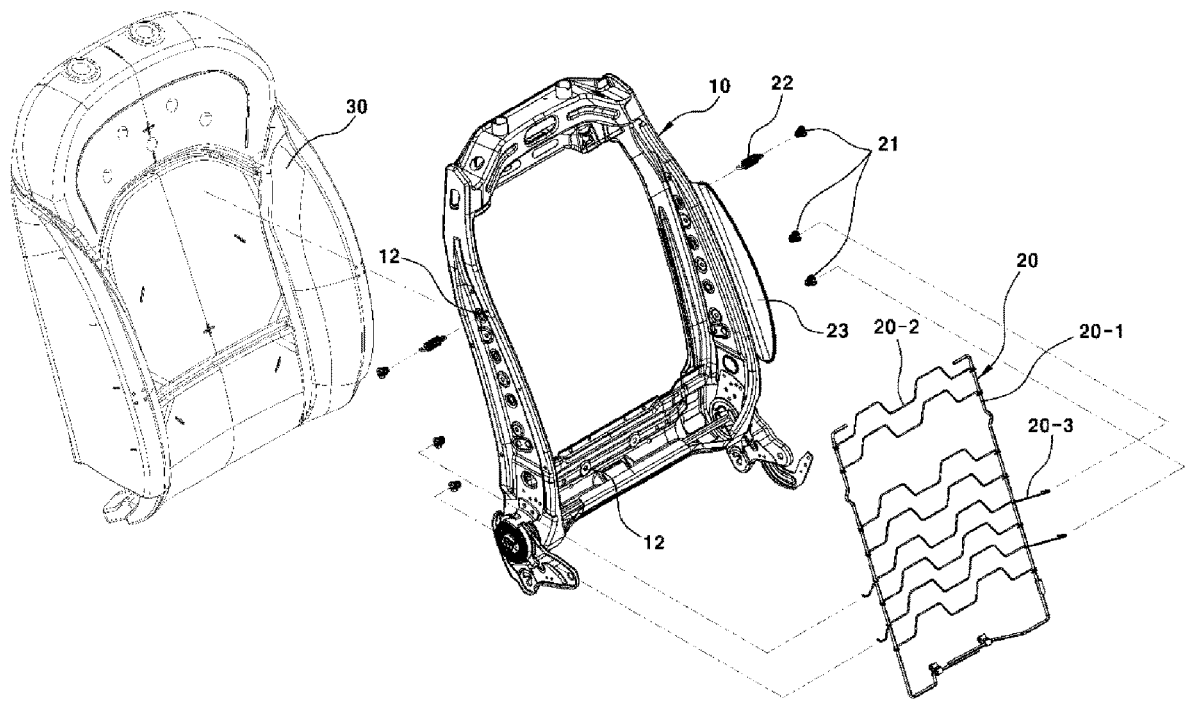
FIG. 1 is a perspective view exemplarily illustrating an assembly structure between a seat back frame and a suspension in a conventional seat back.
Figure 2:
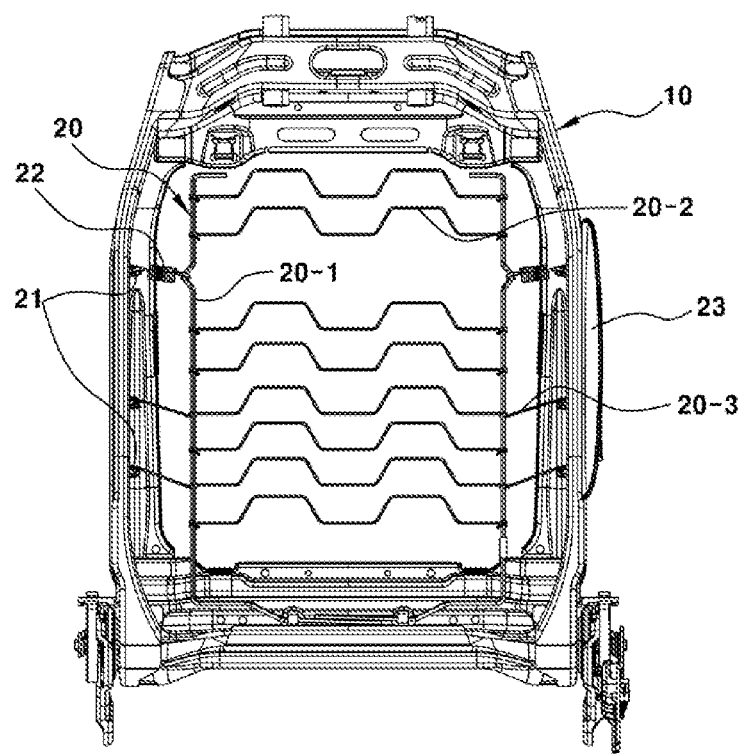
FIG. 2 is a front view exemplarily illustrating the assembly structure between the seat back frame and the suspension in the conventional seat back.
Figure 3:
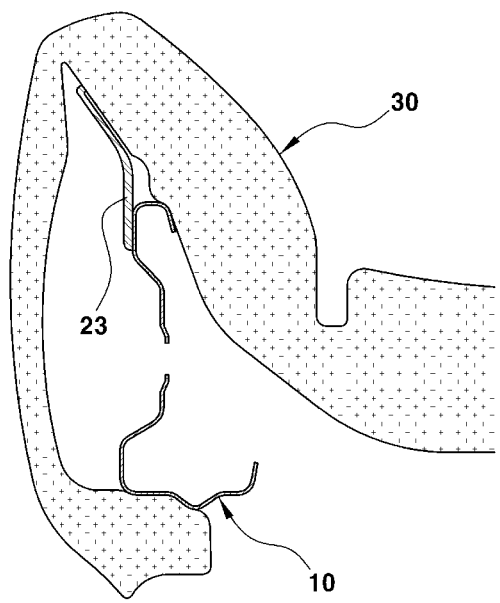
FIG. 3 is a cross-sectional view exemplarily illustrating a state in which a seat back pad is covered after the suspension is assembled to the seat back frame in the conventional seat back.

It should be understood that the appended drawings are not necessarily to scale, presenting a somewhat simplified representation of various exemplary features illustrative of the basic principles of the present invention. The specific design features of the present invention as disclosed herein, including, for example, specific dimensions, orientations, locations, and the particular intended application and use environment shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 4:
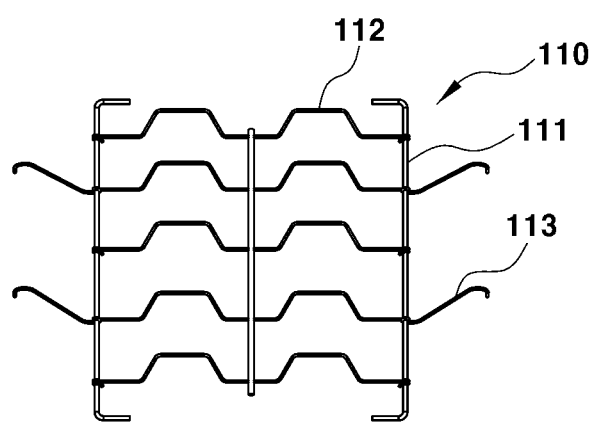
FIG. 4, FIG. 5A and FIG. 5B are perspective views illustrating an integrated suspension structure as one component of a vehicle seat back according to an exemplary embodiment of the present invention.
Figure 5A:
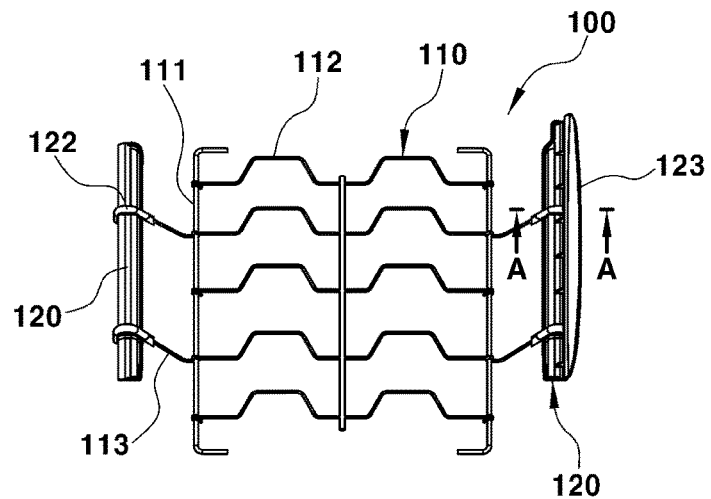
Figure 5B:
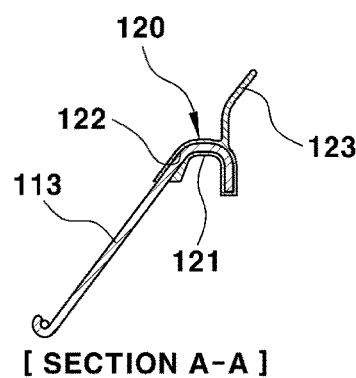

FIG. 4 and FIG. 5 illustrate an integrated suspension structure forming a vehicle seat back according to an exemplary embodiment of the present invention, and the integrated suspension structure is designated by reference numeral 100 in FIG. 5.

The integrated suspension structure 100 includes a suspension wire 110, and suspension mounting guides 120 coupled to both sides of the suspension wire 110.

The suspension wire 110 is integrated with a seat back pad as described later, provided as the frame of the sea back pad and to increase the support rigidity of the seat back pad.

To the present end, the suspension wire 110 includes a plurality of vertical wires 111, a plurality of horizontal wires 112 connecting the vertical wires 111, and a plurality of hook wires 113 extending obliquely forward from both vertical wires 111.

The suspension mounting guides 120 are assembled with the suspension wire 110, and then integrated with the seat back pad, as described later, to serve as a frame for the internal to both the sides of the seat back pad and simultaneously serve as a medium for assembly with a seat back frame.

To the present end, each of the suspension mounting guides 120 has a 'U'-shaped cross-sectional structure. The suspension mounting guide 120 has a support groove 121 formed in the back thereof for insertion of the seat back frame, and hook fastening holes 122 formed in the front thereof for insertion of the associated hook wires 113 of the suspension wire 110.

Furthermore, a side airbag guide 123 is formed integrally outwardly from the front of at least one of the suspension mounting guides 120 (A suspension mounting guide disposed toward the external side of the seat back) to guide the deployment direction of a side airbag for preparing for a side collision.

The hook wires 113 of the suspension wire 110 are press-fitted into the hook fastening holes 122 of the suspension mounting guides 120 so that the integrated suspension structure 100 including the suspension wire 110 and the suspension mounting guides 120 is provided.

This integrated suspension structure 100 is inserted into a mold for foaming the seat back pad, and then integrated with the seat back pad during the foaming of the seat back pad.

To the present end, a process of inserting the integrated suspension structure 100 into a mold 200 for seat back pad foaming and then foaming the seat back pad is performed.

Figure 6:
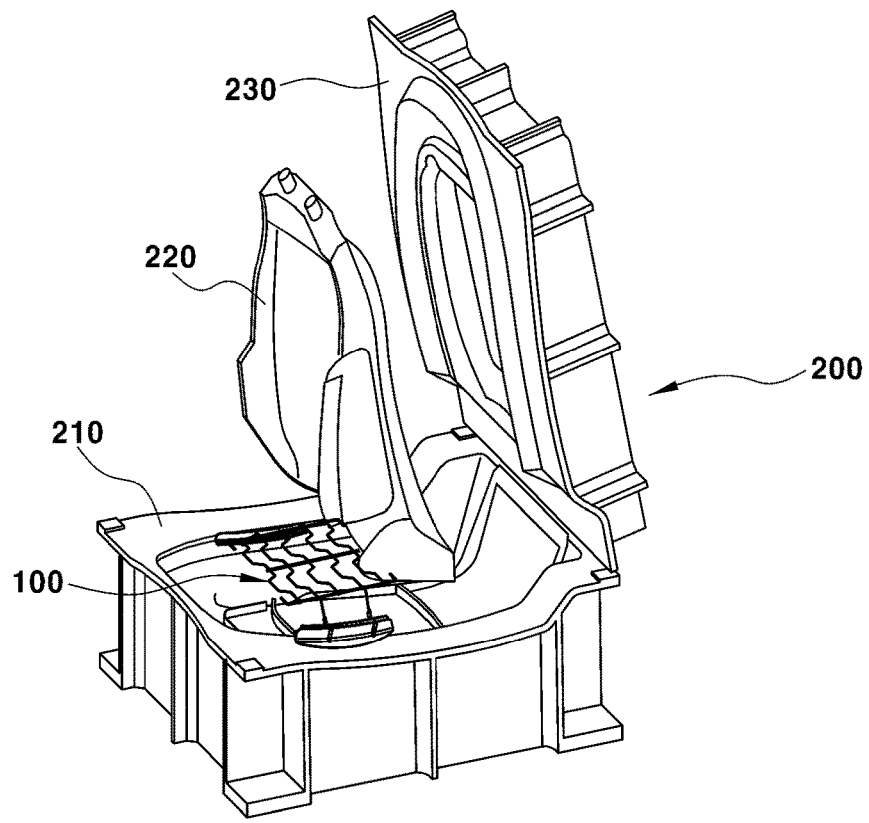
FIG. 6 is a perspective view exemplarily illustrating a mold for foaming a seat back pad as one component of the vehicle seat back according to an exemplary embodiment of the present invention.

FIG. 6 illustrates the mold for foaming the seat back pad as one component of the vehicle seat back according to an exemplary embodiment of the present invention.

As illustrated in FIG. 6, the mold 200 for seat back pad foaming includes a lower mold 210 having a cavity as a space for foaming of the seat back pad, a middle mold 220 for securing the back profile of the seat back pad, and an upper mold 230 covering the middle mold 220 and clamped to the lower mold 210.

After the integrated suspension structure 100 is inserted into the cavity defined in the lower mold 210 of the mold 200, the middle mold 220 for securing the back profile of the seat back pad is disposed on the integrated suspension structure 100. Subsequently, after the upper mold 230 is clamped to the lower mold 210, a seat back pad foam material is injected into the mold 200 to foam the seat back pad which is designated by reference numeral 130.

Thus, the integrated suspension structure 100 inserted into the mold 200 is embedded in the seat back pad 130 by the foaming of the seat back pad 130 so that the integrated suspension structure 100 is integrated with the seat back pad 130.

Figure 7:
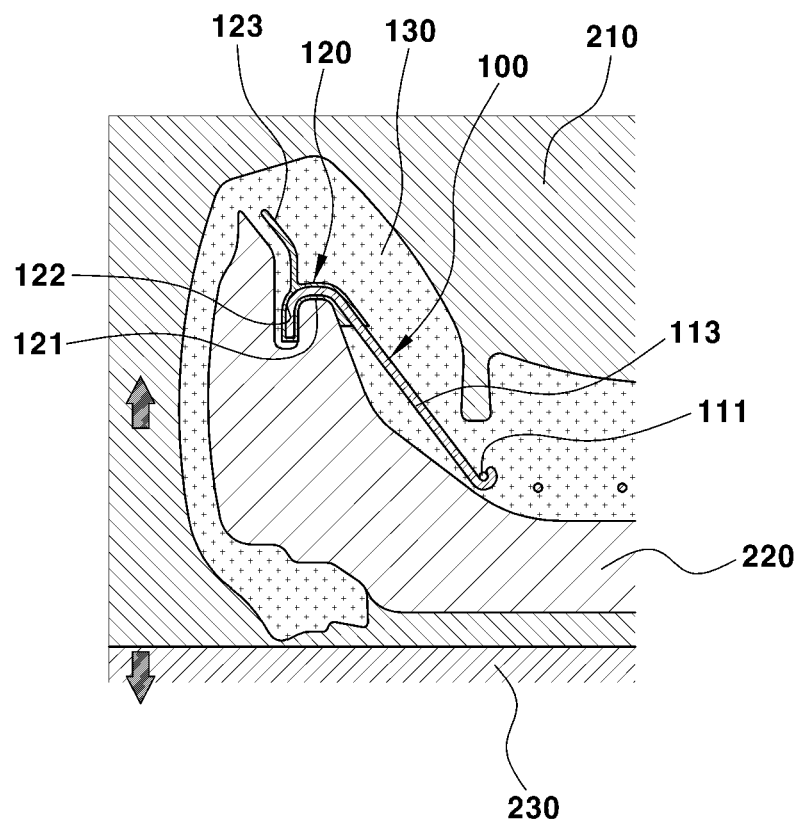
FIG. 7 is a cross-sectional view exemplarily illustrating a state in which the integrated suspension structure is integrated with the seat back pad after foaming of the seat back pad in the vehicle seat back according to an exemplary embodiment of the present invention.

FIG. 7 illustrates a state in which the integrated suspension structure is integrated with the seat back pad after the foaming of the seat back pad in the vehicle seat back according to an exemplary embodiment of the present invention.

As illustrated in FIG. 7, the integrated suspension structure 100 is integrated with the seat back pad 130 by the foaming of the seat back pad 130, and the support groove 121 formed in the rear of each suspension mounting guide 120 of the integrated suspension structure 100 is externally exposed through the rear of the seat back pad 130 such that the side plate 142 of the seat back frame 140 is inserted into the support groove 121.

Figure 8:
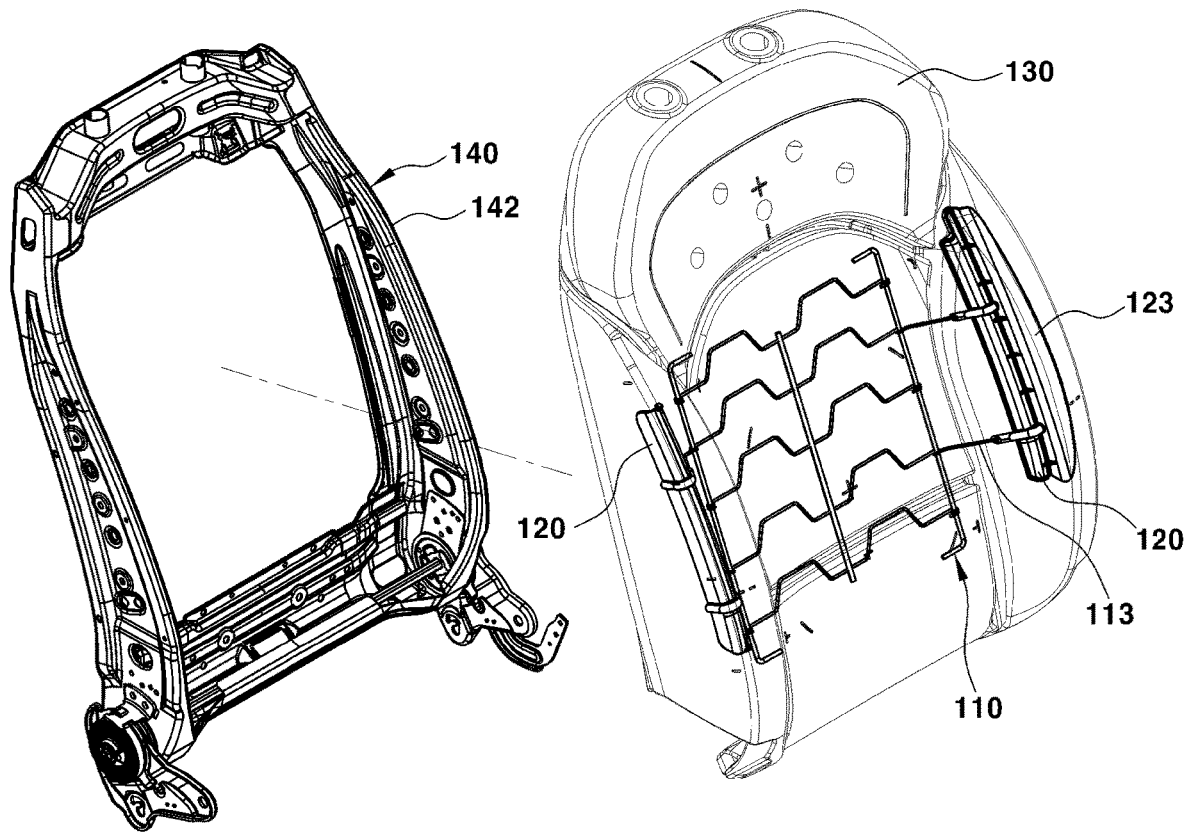
FIG. 8 is a perspective view exemplarily illustrating a state in which a seat back frame is assembled after the integrated suspension structure is integrated with the seat back pad in the vehicle seat back according to an exemplary embodiment of the present invention.
Figure 9:
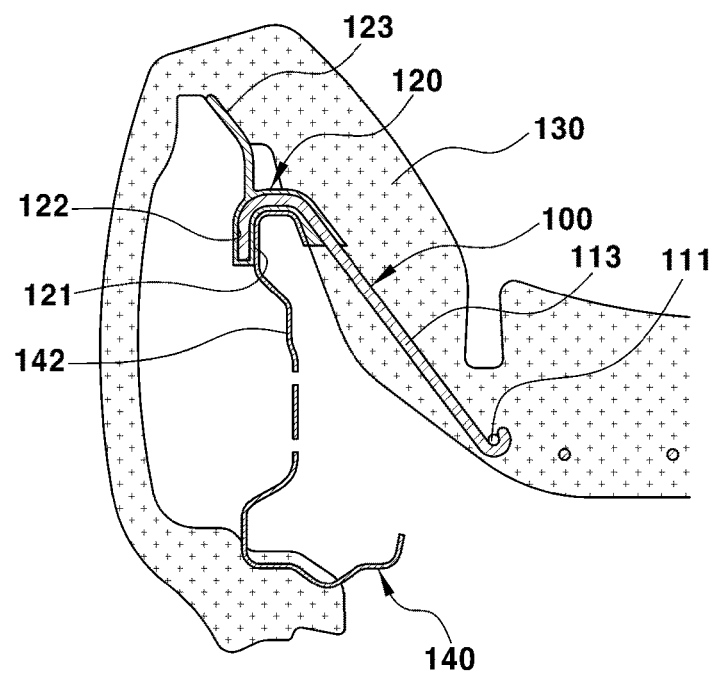
FIG. 9 is a cross-sectional view exemplarily illustrating a state after the seat back frame is assembled after the integrated suspension structure is integrated with the seat back pad in the vehicle seat back according to an exemplary embodiment of the present invention.

After the foaming of the seat back pad 130, the front end portion of the side plate 142 of the seat back frame 140 is inserted into the support groove 121 of the suspension mounting guide 120, as illustrated in FIG. 8 and FIG. 9. Thus, the seat back pad 130 is covered by the seat back frame 140.

As described above, by integrating the integrated suspension structure 100 with the seat back pad 130 during the foaming of the seat back pad 130 and then coupling it with the seat back frame 140, it is possible to reduce the number of processes for assembly of the seat back, the number of parts, and costs.

In other words, since a large number of parts such as back frame connection bushings, suspension springs, and mounting bolts are required to assemble a suspension wire to a seat back frame in the related art, there are problems in that a significant increase in cost is caused due to the excessive number of parts and assembly workability deteriorates due to many processes for assembling the parts. However, since the integrated suspension structure 100 is integrated with the seat back pad 130 and then coupled with the seat back frame 140 in an exemplary embodiment of the present invention, it is possible to reduce the number of processes for assembly of the seat back, the number of parts, and costs.

As is apparent from the above description, the present invention has the following effect.

In accordance with various aspects of the present invention, it is possible to reduce the number of processes for assembly of the seat back, the number of parts, and costs by integrating the integrated suspension structure, in which the suspension wire and the side airbag guide are assembled to each other, with the seat back pad during the foaming of the seat back pad.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle seat back comprising:
an integrated suspension structure including a suspension wire and suspension mounting guides coupled to a first portion and a second portion of the suspension wire; and
a seat back pad foamed for integrating with the integrated suspension structure, wherein the suspension wire includes:
a plurality of horizontal wires;
a plurality of vertical wires connected perpendicular to the plurality of horizontal wires; and
a plurality of hook wires extending obliquely forward from distal end portions of the horizontal wires;
wherein each of the suspension mounting guides has:
a support groove formed for insertion of a seat back frame; and
hook fastening holes formed in a front of the support groove for insertion of the plurality of hook wires of the suspension wire into the hook fastening holes; and
wherein a side airbag guide is formed to protrude from at least one of the suspension mounting guides in a direction away from the suspension wire, and the side airbag guide is integrally formed with the suspension mounting guides.

2. The vehicle seat back of claim 1, wherein the seat back pad is foamed for integrating with the integrated suspension structure while the integrated suspension structure is inserted into a mold for seat back pad formation.

3. The vehicle seat back of claim 1, wherein the integrated suspension structure is embedded in the seat back pad during foaming of the seat back pad, and support grooves formed in the suspension mounting guides are exposed to an outside of the seat back pad.

4. The vehicle seat back of claim 3, wherein end portions of a side plate of a seat back frame are inserted into the support grooves of the suspension mounting guides.

* * * * *